A. L. AMEND.
FLY TRAP.
APPLICATION FILED FEB. 10, 1914.

1,166,306. Patented Dec. 28, 1915.

Witnesses
Frederic W. Ely
B. L. Dewoustry Jr.

Inventor
A. L. Amend,
By Victor J. Evans
Attorney

UNITED STATES PATENT OFFICE.

ALVAN L. AMEND, OF WICHITA, KANSAS.

FLY-TRAP.

1,166,306.

Specification of Letters Patent.     Patented Dec. 28, 1915.

Application filed February 10, 1914. Serial No. 817,873.

*To all whom it may concern:*

Be it known that I, ALVAN L. AMEND, a citizen of the United States, residing at Wichita, in the county of Sedgwick and State of Kansas, have invented new and useful Improvements in Fly-Traps, of which the following is a specification.

This invention relates to fly traps.

The principal object of the invention is to provide a simple and inexpensive trap of this character in which the parts are so arranged that any fly or other similar insect gaining access to the bait cannot escape from the trap.

Further objects of the invention will appear as the following description is read in connection with the accompanying drawing, which forms a part of this application, and in which:—

Figure 1:
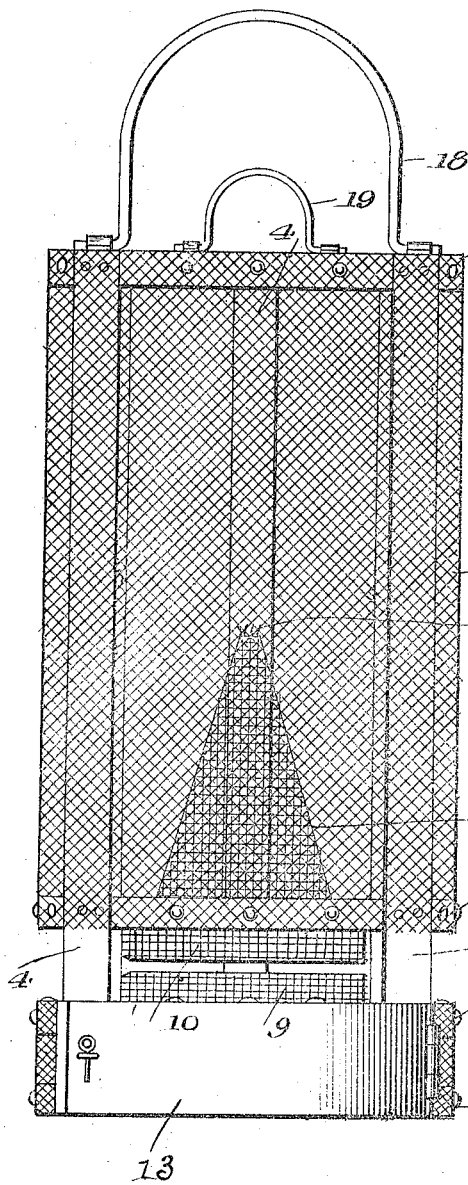
Figure 2:
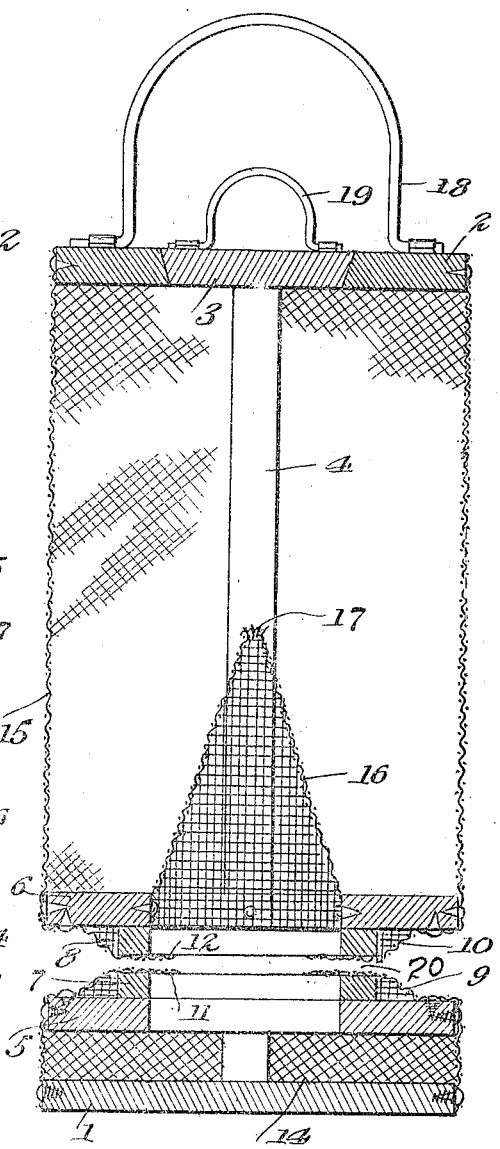

Figure 1 is a side elevation. Fig. 2 is a vertical sectional view.

Referring more particularly to the drawing, 1 represents the base and 2 the top, the latter being apertured to receive a closing lid 3 by which the insects may be removed from the trap, as will be hereinafter more clearly understood. The bottom and top are held in separated relation by uprights 4 which are spaced apart suitable distances and are of the required dimensions to give the proper support to the parts. Secured to the uprights 4 a short distance above the base 1 are centrally apertured disks 5 and 6, both of which have secured thereto the rings 7 and 8, respectively. The ring 7 is secured to the top of the disk 5 while the ring 8 is secured to the bottom of the disk 6. Covering the rings and disks are separate rings of wire screen 9 and 10, the inner edges of which overlap the inner edge of the ring a short distance so as to provide guards or shields 11 and 12 which prevent the escape of the flies from the trap. A strip of screen fabric or other similar reticulate material extends around the lower portion of the trap and is connected to the base 1 and disk 5 in any suitable manner. The remaining portion is closed by a door 13 which permits access to the bait compartment 14, the bait pan or other receptacle resting upon the base 1 immediately below the opening in the disk 5. The upper portion of the trap is surrounded by screen fabric 16 which is attached to the disk 6 and to the top 2 and has its end edges connected to one of the posts or uprights 4. This fabric with the disk 6 and top 2 form the trap compartment.

Secured to the inner edge of the disk 6 and extending up into the trap compartment is a cone 16 of reticulate material having an opening 17 at its upper end to permit of the passage of the flies into the trap compartment.

The top of the trap has a suitable bail 18 by which the trap may be carried and the lid or cover 3 is provided with a bail 19 which affords a means for manipulating the lid.

By constructing the trap in the manner shown with the rings 7 and 8 arranged closely adjacent each other an annular channel 20 is provided for the passage of the flies into the trap and as this channel is guarded by the ragged edges of the inner portions of the rings 9 and 10 it is extremely difficult for a fly to find his way out of the trap when once he has gained access to the bait compartment.

In the operation of the device the fly scenting the bait within the bait compartment passes through the channel and flies downwardly into the bait compartment, then flying upwardly in an endeavor to get out of the compartment he enters the cone and passes through the opening 17 into the trap compartment from which he can find no exit. When it is necessary to remove flies from the trap compartment they may be first killed by immersing the trap in scalding water or in any other suitable manner and then removed through the opening in the top by inverting the trap.

What is claimed is:—

A fly trap comprising in combination, spaced superimposed disks, one of said disks constituting a base, and the other being provided with a central opening, a ring of foraminous material connecting said disks and defining a chamber by the intervening space therebetween, a door controlling access to said chamber, a ring supported upon said apertured disk and surrounding the opening therein, a piece of reticulated material secured to said disk and ring and extending beyond the inner periphery of the latter, uprights rising from said base, and a trapping chamber supported by said uprights in spaced relation to the first mentioned chamber but in communication therewith through said openings.

In testimony whereof I affix my signature in presence of two witnesses.

ALVAN L. AMEND.

Witnesses:
 EARL CARROTHERS,
 ANNIE C. AMEND.